Nov. 7, 1961

J. O. EAMES 3,007,554

LIQUID-COOLED FRICTIONAL MECHANISM

Filed Dec. 30, 1957

INVENTOR.
James O. Eames
BY
Scrivener and Parker
ATTORNEYS

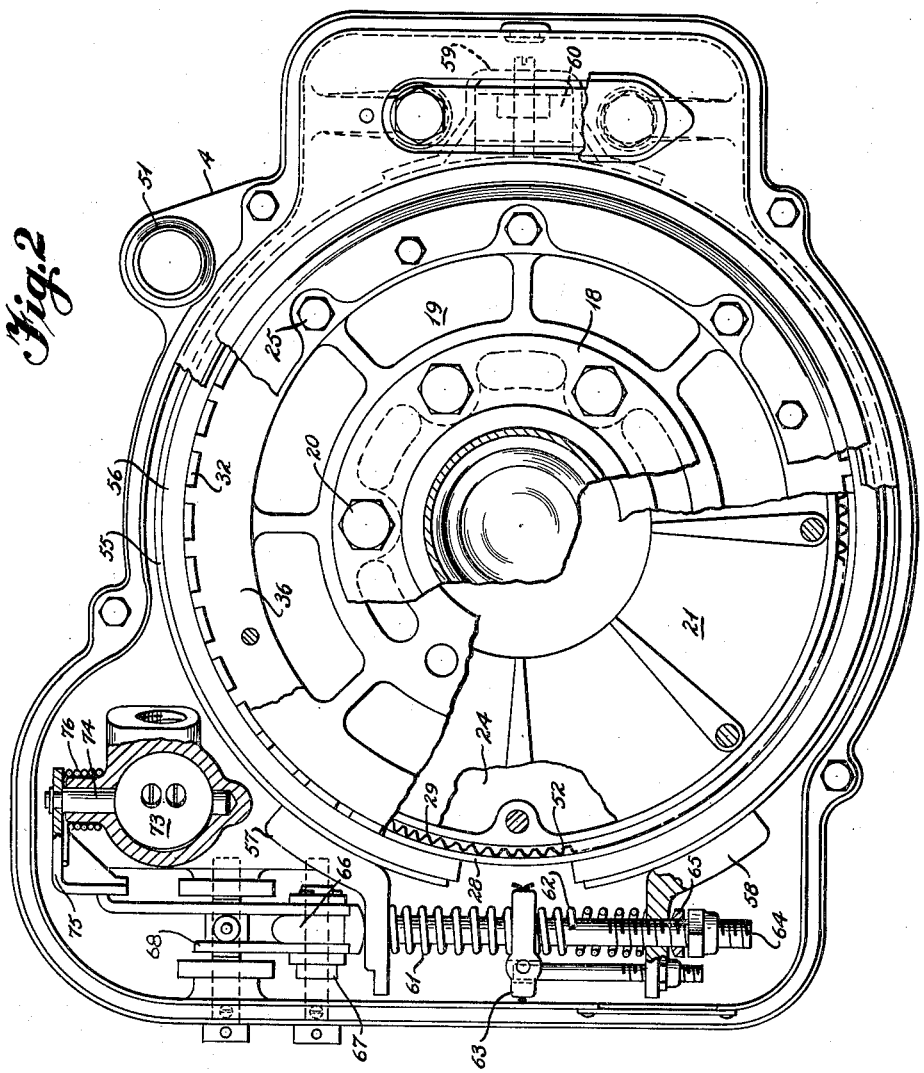

Nov. 7, 1961 J. O. EAMES 3,007,554
LIQUID-COOLED FRICTIONAL MECHANISM
Filed Dec. 30, 1957 10 Sheets-Sheet 3

INVENTOR.
James O. Eames
BY
Scrivener & Parker
ATTORNEYS

Nov. 7, 1961 J. O. EAMES 3,007,554
LIQUID-COOLED FRICTIONAL MECHANISM
Filed Dec. 30, 1957 10 Sheets-Sheet 4
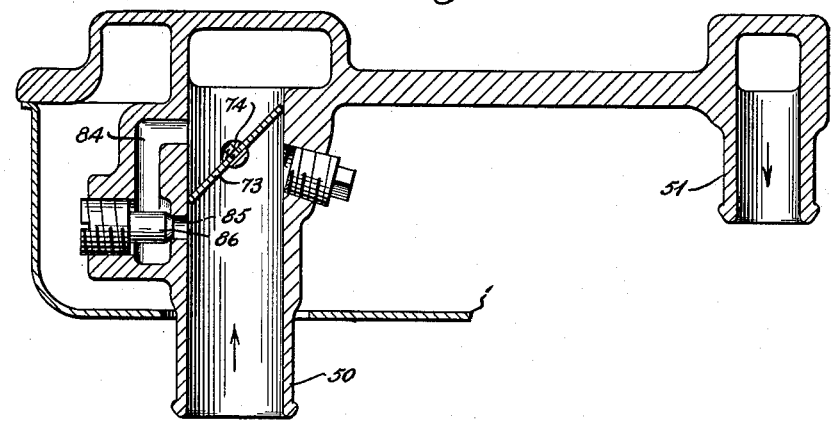
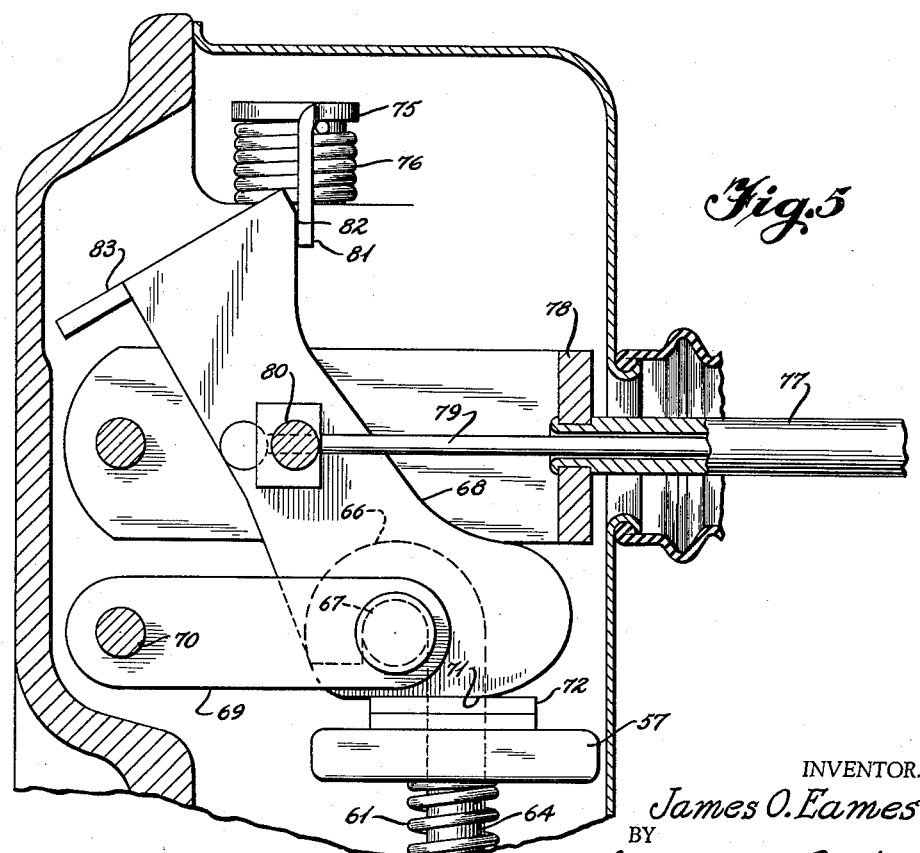
INVENTOR.
James O. Eames
BY
Scrivener and Parker
ATTORNEYS

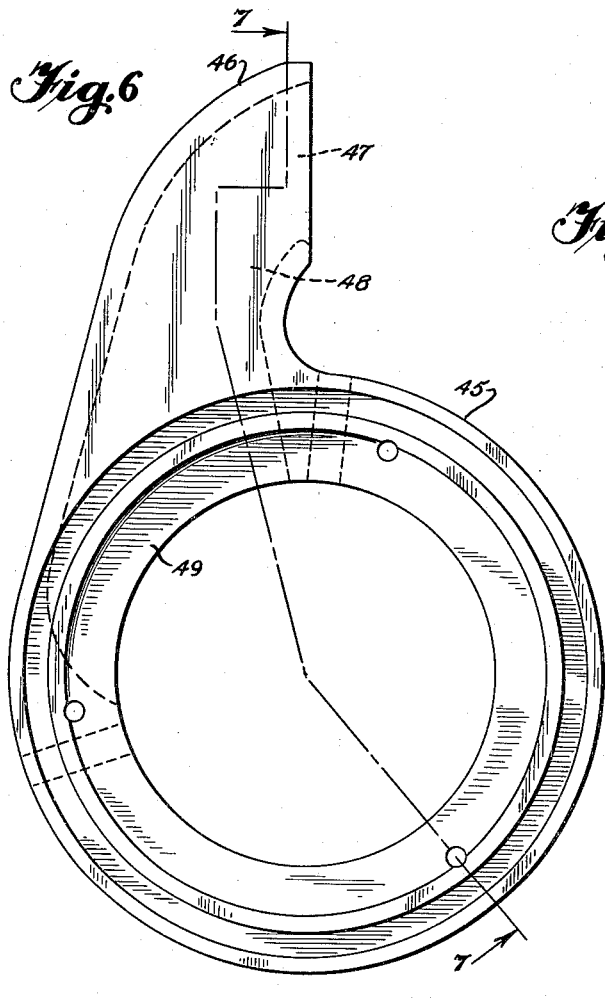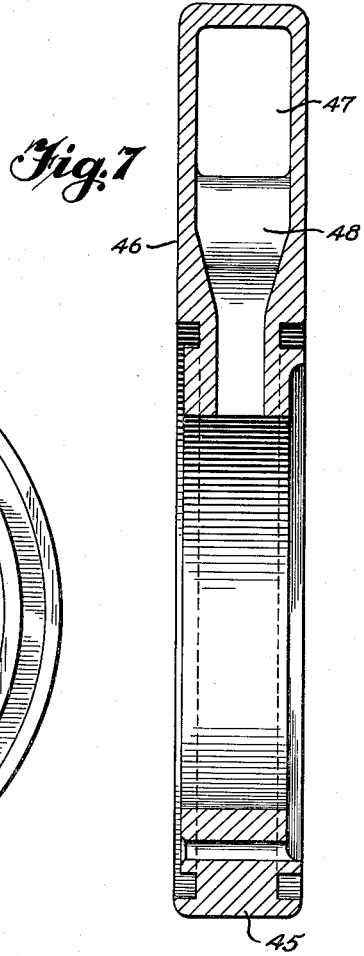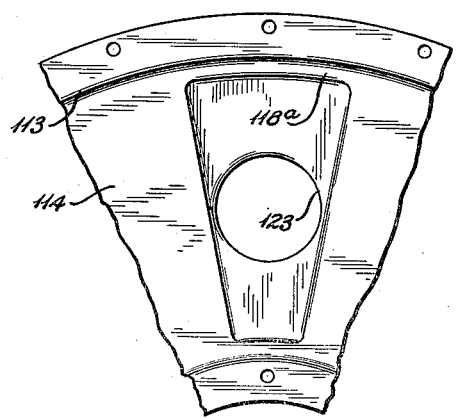

Nov. 7, 1961   J. O. EAMES   3,007,554
LIQUID-COOLED FRICTIONAL MECHANISM
Filed Dec. 30, 1957   10 Sheets-Sheet 6
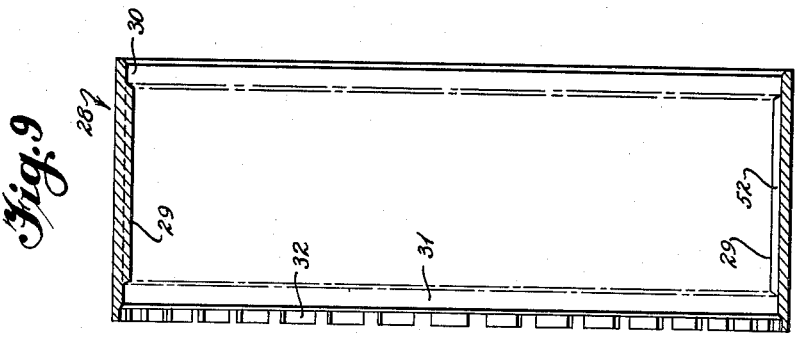
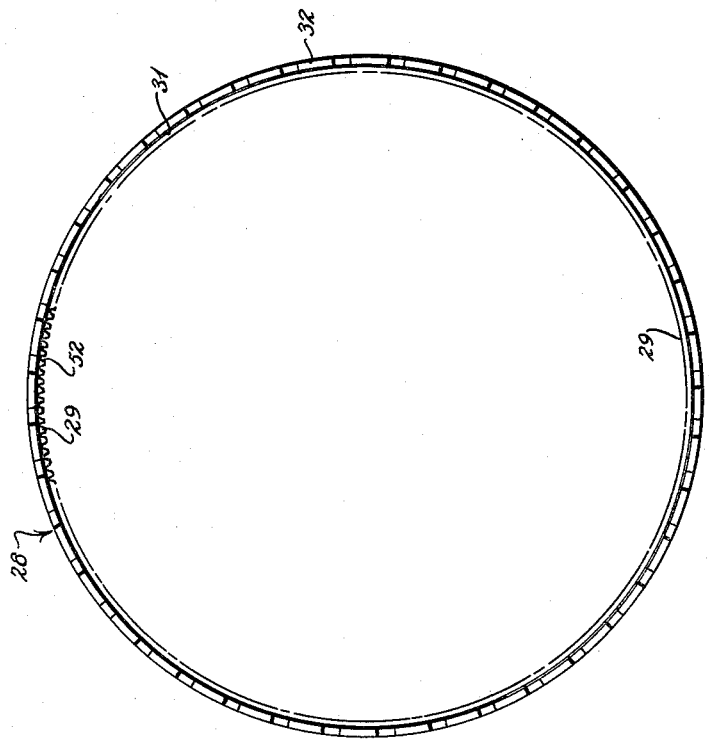
INVENTOR.
James O. Eames
BY
Scrivener and Parker
ATTORNEYS

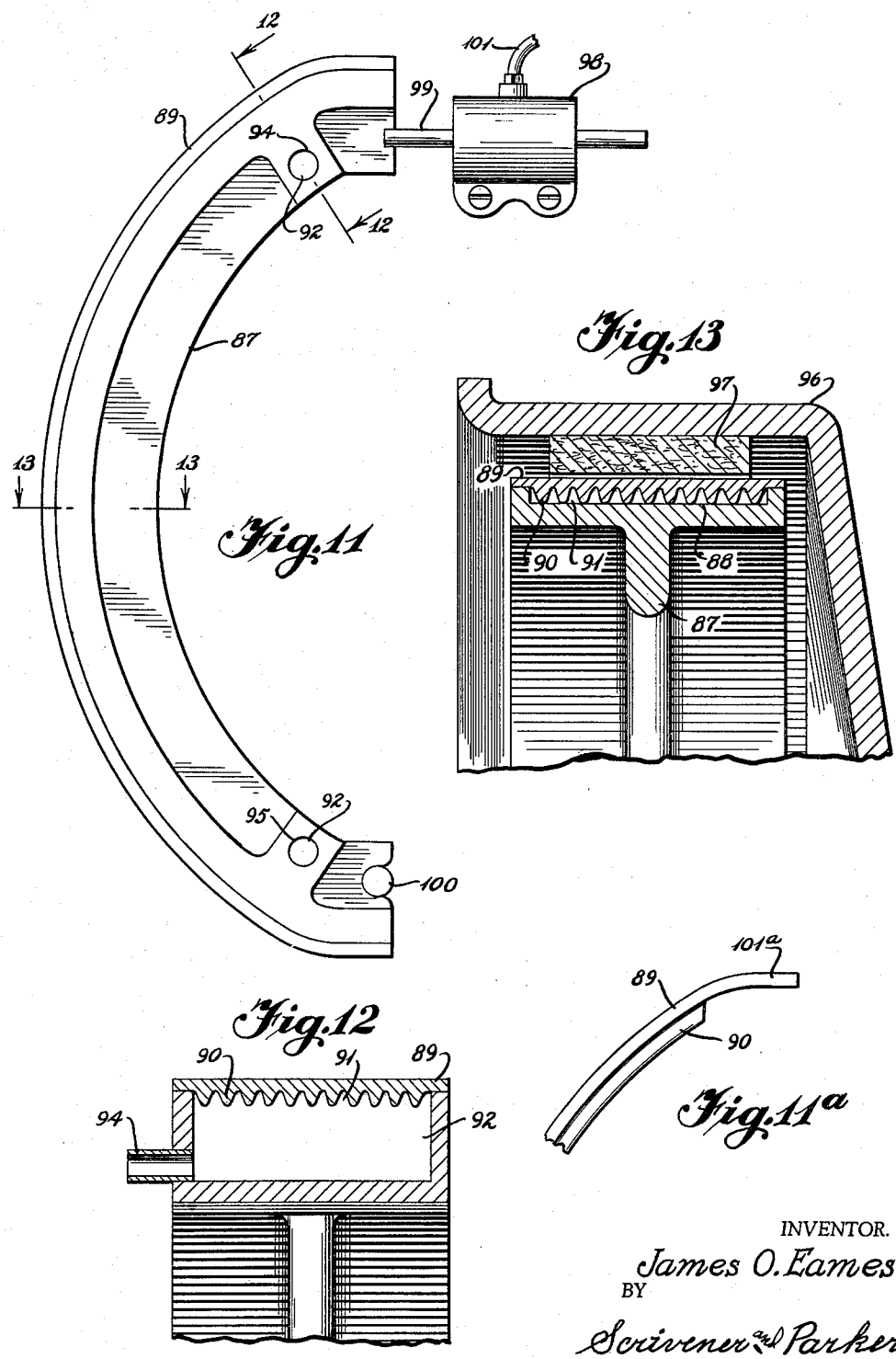

Nov. 7, 1961  J. O. EAMES  3,007,554
LIQUID-COOLED FRICTIONAL MECHANISM
Filed Dec. 30, 1957  10 Sheets-Sheet 8
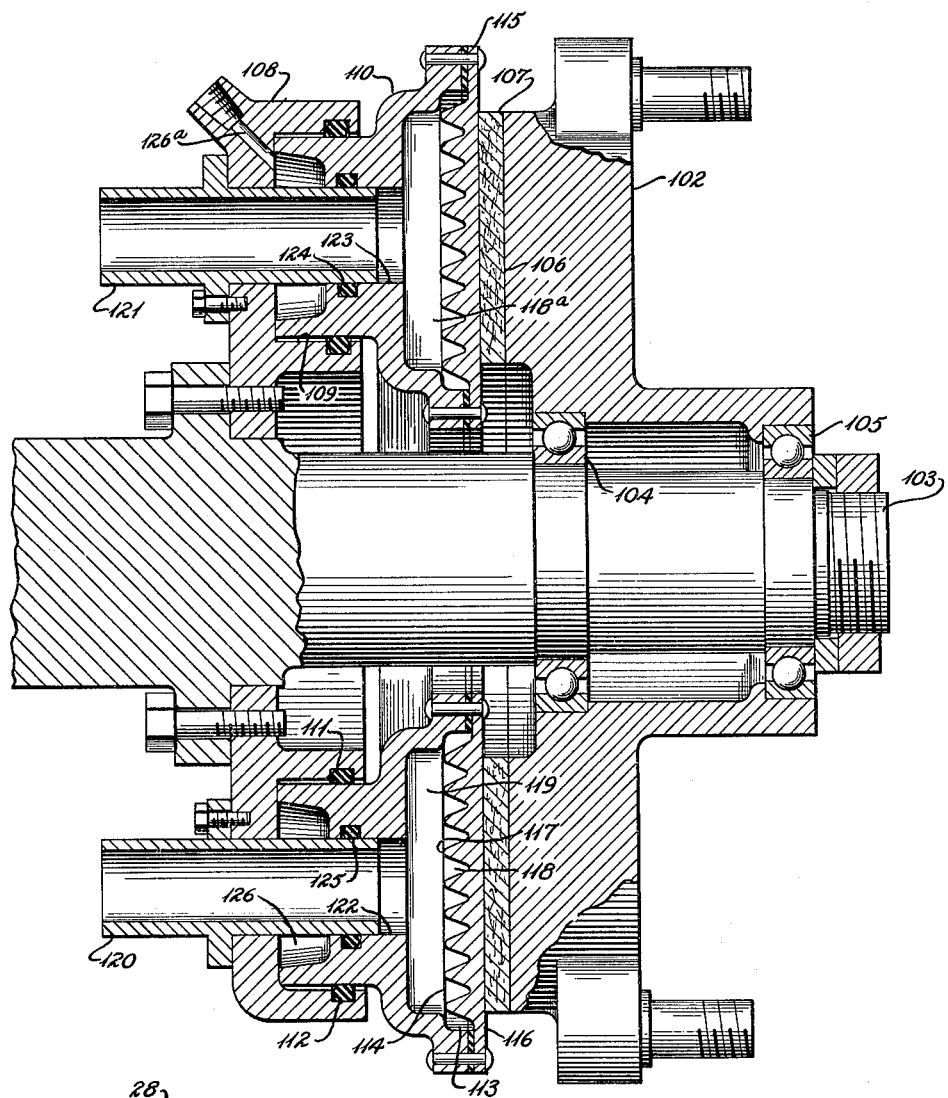
INVENTOR.
James O. Eames
BY
Scrivener and Parker
ATTORNEYS

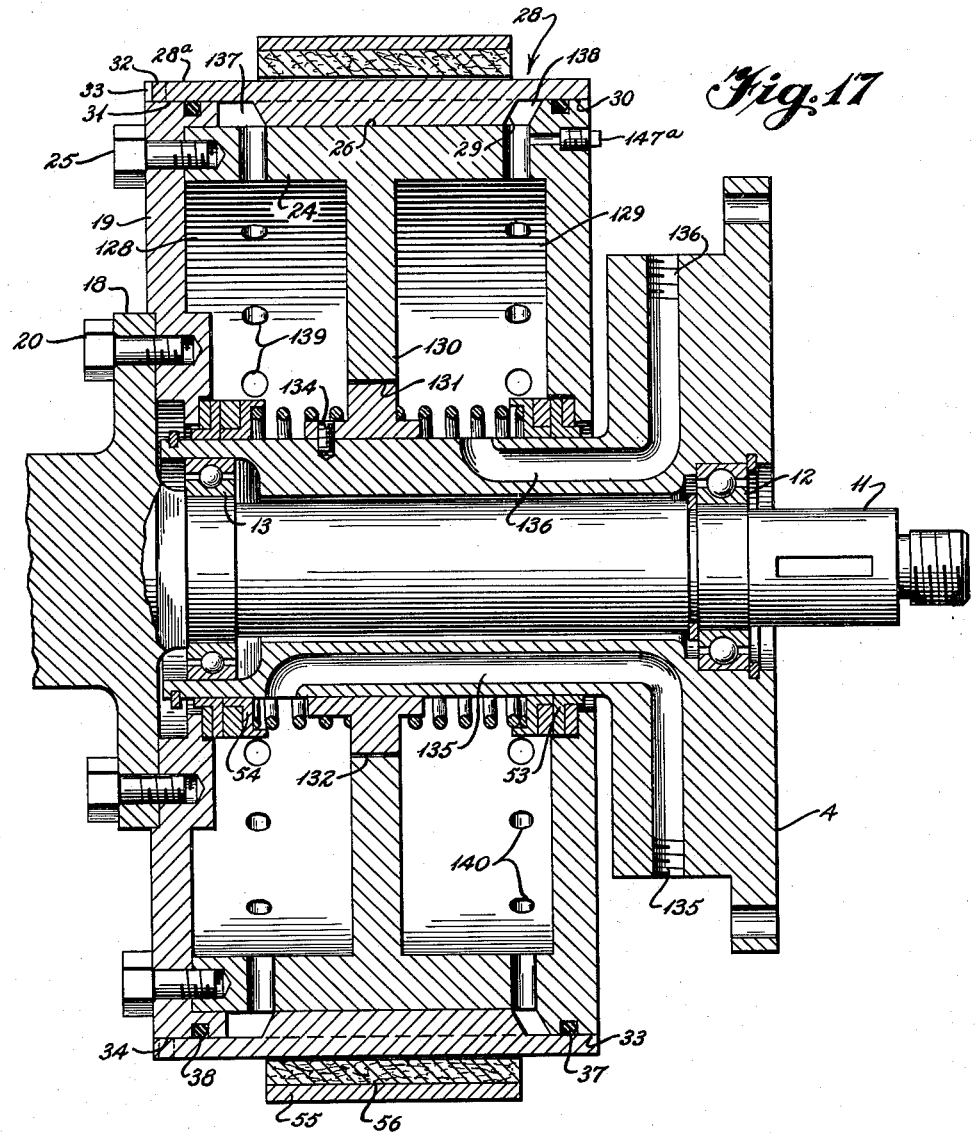

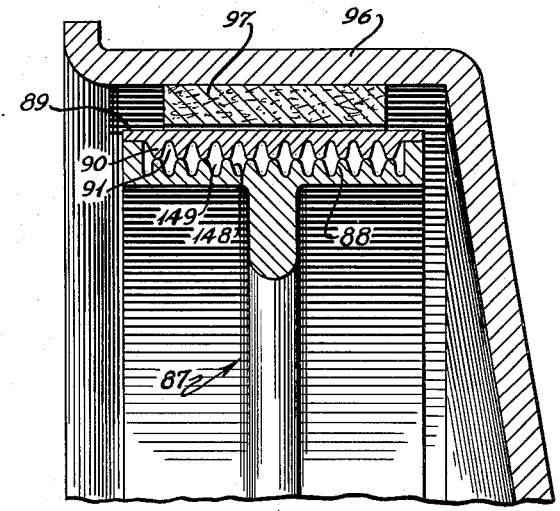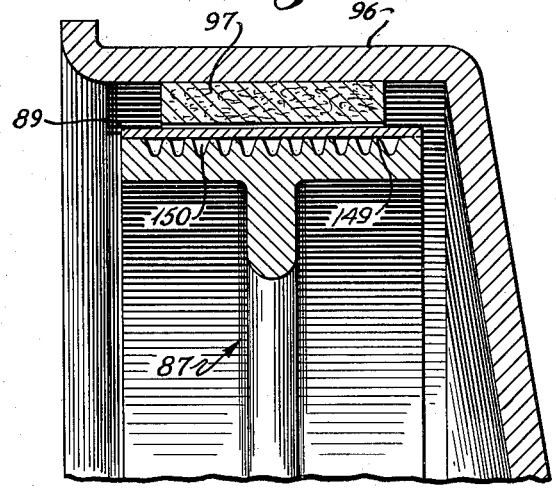

United States Patent Office 3,007,554
Patented Nov. 7, 1961

3,007,554
LIQUID-COOLED FRICTIONAL MECHANISM
James O. Eames, Washington, Conn. (P.O. Box 400, Seymour, Conn.), assignor to Roy S. Sanford, Woodbury, Roger H. Casler and James O. Eames, Washington, and Wilfred A. Eaton and Erling D. Sedergren, Woodbury, Conn.
Filed Dec. 30, 1957, Ser. No. 706,032
17 Claims. (Cl. 188—264)

This invention relates to frictional mechanisms such as brakes and clutches, hereinafter generally referred to as brake mechanisms, and more particularly to brake mechanisms of the liquid cooled type.

The excessive heat developed during the operation of brake mechanisms has caused great difficulty in the past, and it has been found that in the event a relatively thin metal friction element can be utilized adapted for engagement with a brake lining on one side, and adapted to be engaged by a circulating cooling liquid on the other side, these difficulties can be largely overcome.

Although metals such as iron and steel may be utilized for the metal friction element in cases where the energy absorption rate required of the brake is quite low, it has been found that outstanding benefits are obtained from liquid cooling of the brakes only when the metal friction elements are formed of "high thermal conductivity metals" such metals including copper, silver, and certain alloys or combinations thereof, and having a melting point of at least 1500° F. and a overall thermal conductivity of at least 40% of that of electrolytic copper, substantially pure metal such as bus bar or electrolytic copper has been found to be particularly suitable. These metals are used against relatively non-heat-conductive composition brake linings, and particularly those linings of the type comprised of fibers, a binder, and certain friction augmenting and modifying materials.

Due to the inherent lack of strength of thin metal, and particularly of ductile metals such as copper and some of the other above mentioned high thermal conductivity metals, it has been found difficult to properly support such a friction element so as to prevent distortion during the braking operation, while at the same time making the friction element thin enough to provide for a rapid and efficient transfer of heat from the friction surface of the element to the cooling liquid on the opposite surface thereof. Although as stated above, high thermal conductivity metals are particularly adapted to this type of service, it will be understood that other metals are contemplated, and that the invention has for one of its objects, the provision of means for supporting a thin metal metallic friction element against distortion, while at the same time permitting the surface of the element opposite to that which engages the friction lining to be cooled directly by a circulating cooling liquid over substantially the entire surface directly opposite the friction surface.

Another object of the invention is the provision of a novel brake shoe of the liquid cooled type.

Still another object of the invention is to provide a means for supporting a metallic friction element, so constituted as to provide maximum heat transfer to the cooling liquid.

Yet another object of the invention is to provide, in brake mechanism of the above type, means for directing the flow of cooling liquid along the surface of the friction element opposite the friction surface thereof.

A still further object of the invention is to provide novel brake mechanism of the liquid cooled type wherein the cooling liquid is circulated by the brake mechanism rather than by outside means.

Another object of the invention is to provide, in a brake mechanism of the above type, means for supporting a liquid cooled metal friction element, so constituted as to permit thermal expansion and contraction of the element without damage to the friction element or to the associated mechanism.

A further object of the invention is to provide a novel liquid cooled brake drum.

These and other novel features and objects of the invention will be more readily apparent from the following detailed description when taken in connection with the accompanying drawings. It is to be expressly understood, however, that the description and drawings are not to be taken as defining the limits of the invention, reference being had for this purpose to the appended claims.

In the drawings,

FIG. 2 is a view, partially in section of the mechanism of FIG. 1 taken from the left;

FIG. 4 is a fragmentary sectional view of a portion of the mechanism shown in FIG. 3 and showing the inlet and outlet conduits;

FIG. 5 is a fragmentary view, partially in section, of a portion of the brake actuating and control mechanism;

FIG. 6 is a side elevational view of a portion of the brake mechanism of FIG. 1;

FIG. 7 is a sectional view of the member of FIG. 6, taken along line 7—7 of that figure;

FIG. 8 is an end view of the brake friction element or brake drum;

FIG. 9 is a side elevation in section of the brake drum of FIG. 8 taken along line 9—9;

FIG. 11 is a view, partially broken away, of an internal brake shoe;

FIG. 11a is a fragmentary side elevational view of a portion of the friction element on the brake shoe of FIG. 11.

FIG. 12 is a sectional view of the brake shoe of FIG. 11 taken along line 12—12;

FIG. 13 is a sectional view of the brake shoe of FIG. 11 associated with a brake drum;

FIG. 14 is a sectional view of a disc brake mechanism;

FIG. 15 is a fragmentary view of a portion of the piston shown in FIG. 14 taken from the right;

FIG. 16 is a view of a modification of the brake drum portion shown in FIG. 10;

FIG. 17 is a sectional view of a modified form of brake mechanism;

FIG. 18 is a schematic view of a liquid circulating system for the mechanism of FIG. 18;

FIG. 19 is a view of a modification of the structure of FIG. 13, and

FIG. 20 shows another modification of the structure of FIG. 13.

Figure 1:
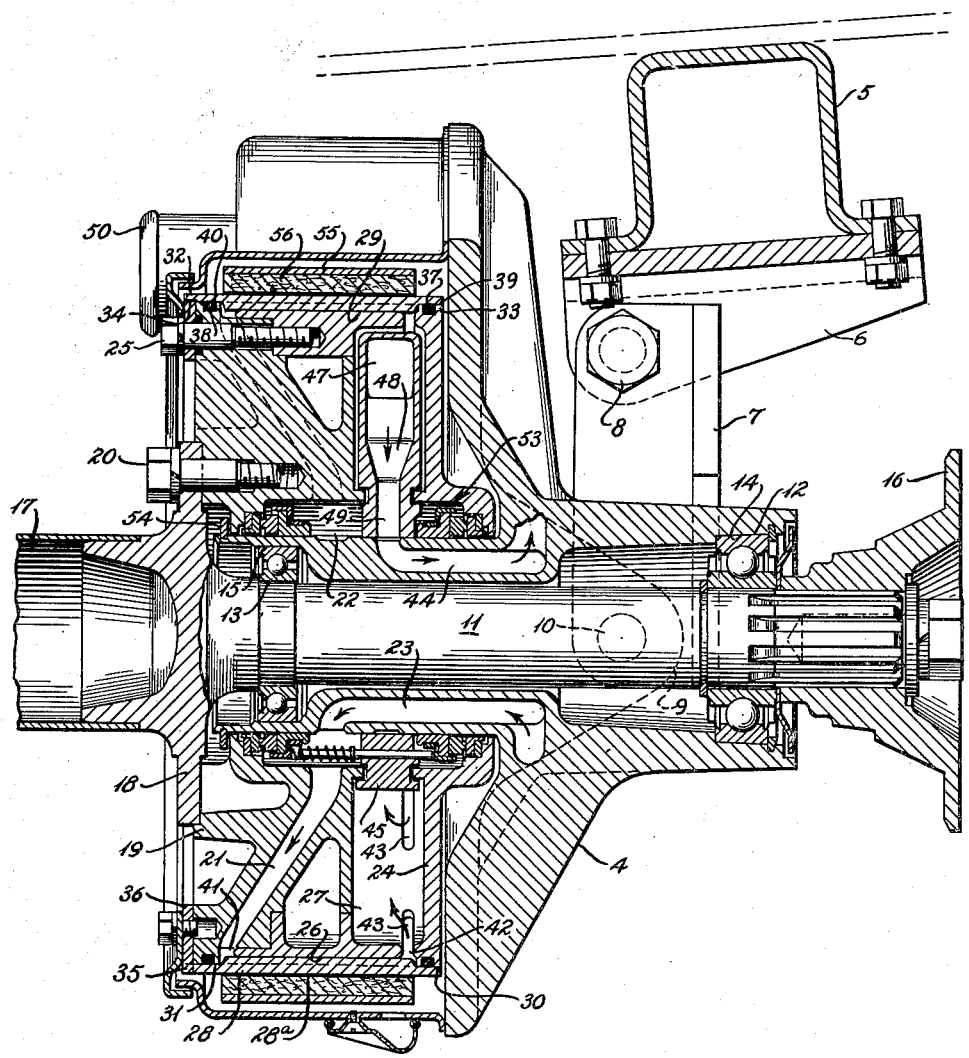
FIG. 1 is a sectional view of a brake mechanism embodying the principles of the invention.

Referring now more particularly to the drawings, FIGS. 1 to 10 inclusive relate primarily to a brake mechanism adapted for use on the drive shaft of a motor vehicle, although the brake mechanism shown is also adapted for use on any rotating shaft wherein a braking application is required. In FIG. 1, a non-rotatable member or stator 4 is supported on a vehicle frame 5 by means of a bracket 6 and links 7 pivotally mounted on the bracket by means of bolts 8 and connected to suitable cars 9 on the stator by bolts 10. A drive shaft 11 is mounted for rotation on ball bearings 12 and 13 mounted in bores 14 and 15 in opposite ends of the stator as shown, the right end of the shaft having a suitable spider 16 mounted thereon for rotation therewith and adapted to be connected to the rear axle of the vehicle by means of a suitable universal joint and propeller shaft not shown, and the left hand end of the shaft being provided with a tubular portion 17 adapted to be connected to the engine of the vehicle. Thus, whenever the vehicle is moving, the shaft 11, being connected to the rear wheels of the vehicle through the differential of the axle, rotates with the wheels, and by applying a brake to the shaft, the wheels may be retarded or stopped as desired.

The shaft is provided adjacent its left end with a flanged portion 18, and this flanged portion is secured to a rotor 19 by means of cap screws 20 as shown. This rotor is concentric with the axis of the shaft 11 and is provided with radial liquid passages 21 connected at their inner ends with an annular chamber 22 formed between the stator and the rotor, this chamber in turn being connected to an inlet passage 23 in the stator, to be described more fully hereinafter. A brake drum carrier 24 is secured to the rotor for rotation therewith by suitable cap screws 25, the carrier having an outer cylindrical surface portion 26 adapted to support a metal friction element or brake drum as will be more fully described hereinafter. The rotor and brake drum carrier, when secured together for rotation with the shaft as above described, form an annular liquid outlet chamber 27.

Figure 10:
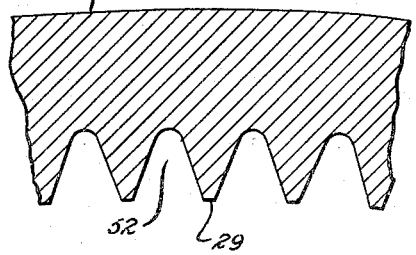
FIG. 10 is an enlarged fragmentary view of a portion of the brake drum of FIG. 8.
Figure 3:
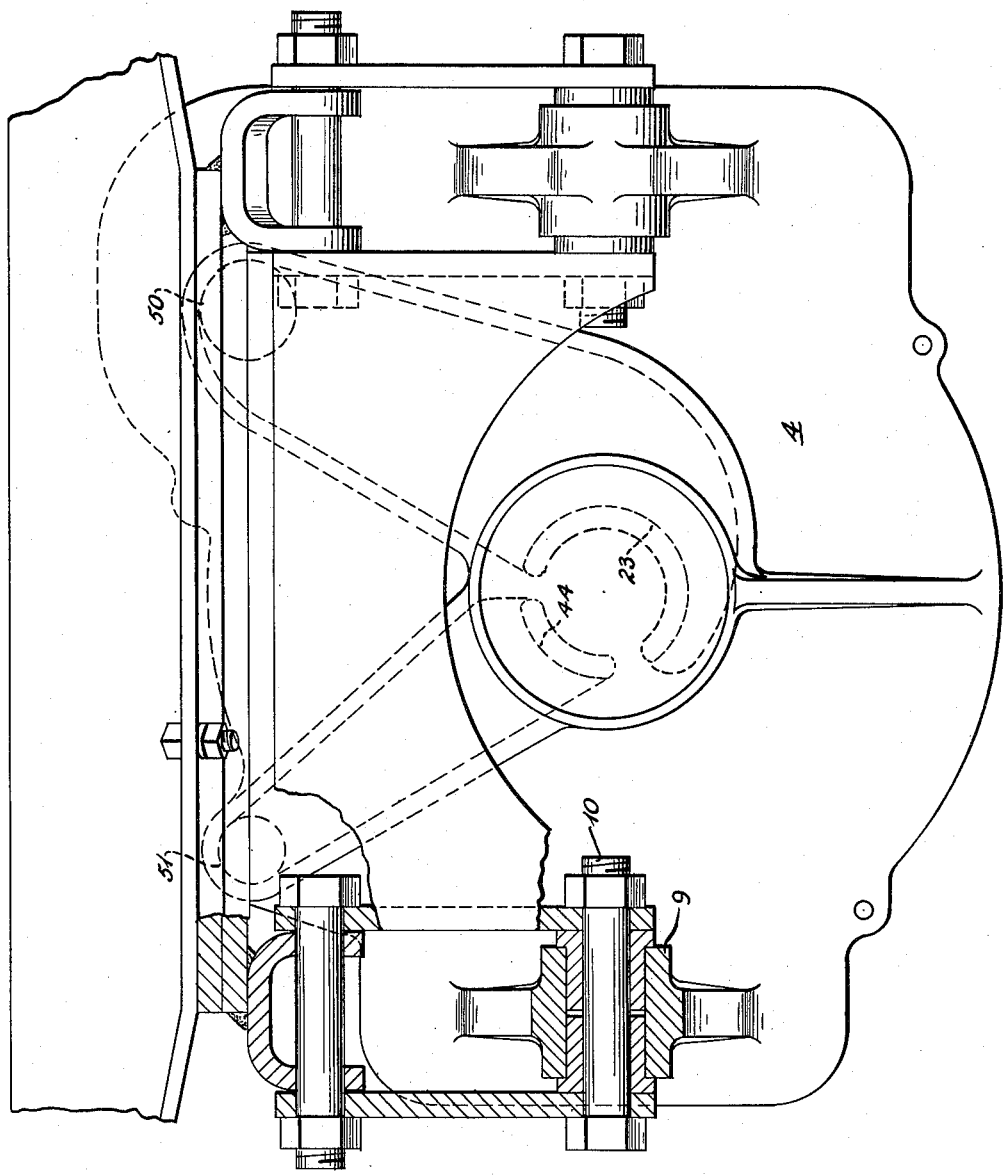
FIG. 3 is a view, partially in section of the mechanism of FIG. 1 taken from the right.

A cylindrical brake drum 28, preferably formed of high thermal conductivity metal, is mounted on the cylindrical surface of the carrier as well as on the rotor, this brake drum being shown in more detail in FIGS. 8 and 9. The outer surface 28a of brake drum is cylindrical, and the inner surface is provided with a plurality of directly adjacent integral parallel teeth 29, which extend for the major portion of the brake drum length as shown in FIG. 9. The teeth are preferably V-shaped, or narrower at the peaks thereof than at the bases. Bores 30 and 31 are formed in the right and left hand ends of the drum respectively for purposes to be described, and the drum at its extreme left end is provided with a plurality of lugs 32 as shown. The teeth are shaped in much the same manner as ordinary gear teeth, except that it is desirable that the ends or peaks of the teeth be very narrow or even be formed with arcuate surfaces for purposes to be described. An enlarged view of one form of the teeth is shown in FIG. 10 of the drawings.

Referring back to FIG. 1, the brake drum is mounted on the carrier in such a manner that the surfaces of the ends of the teeth are in direct physical contact with the outer surface of the carrier, these teeth therefore serving to support the drum against distortion inwardly during the application of the brake, the teeth being in such close proximity that there is very little chance of distortion of the drum in the valleys between the teeth. It will be noted that the teeth are substantially coextensive with the cylindrical outer surface on the carrier and that they extend slightly beyond this surface at either end. The bores 30 and 31 are slidably mounted respectively on cylindrical surfaces 33 and 34 formed on the right end of the carrier and on the left end of the rotor respectively. The lugs 32 engage suitable notches 35 formed in a torque ring 36 secured to the rotor for rotation therewith by means of the cap screws 25 which clamp the rotor and drum carrier together. Thus the torque of the brake drum is transmitted to the rotating parts of the mechanism at one end of the drum only, and due to the fact that the bores 30 and 31 are slidably mounted respectively on the carrier and on the rotor, the drum is free to expand longitudinally as it is heated or cooled during operation of brake. In order to prevent any leakage between the bores of the drum and the carrier and stator, suitable seals 37 and 38 are provided. These seals are of the O ring type and are mounted in grooves 39 and 40 in the carrier and rotor respectively as shown. In order to secure a firm contact between the teeth on the drum and the cylindrical surface on the carrier, the drum is preferably shrunk on to the carrier during assembly of the mechanism, thus preloading the teeth in compression, although it will be understood that other means may be resorted to to secure intimate contact and supporting engagement between the drum and the carrier. The teeth are preferably arcuately contoured so as to have tangential or substantially line contact with the cylindrical surface of the carrier or at least a very narrow area of contact in order that substantally all of the surface of the teeth may be subjected to the cooling liquid which is circulated through the mechanism as will be hereinafter described.

The outer ends of the radial passages 21 in the rotor terminate in an annular groove 41 adjacent the left ends of the teeth 29 on the drum while the drum carrier at the right end of the drum is provided with an annular groove 42 connected to the annular chamber 27 by a plurality of ports 43. The annular chamber 27 is connected in turn with an outlet passage 44 through a stationary extension member 45 secured to the stator in any suitable manner as shown.

Referring to FIGS. 6 and 7, this stationary extension has an outwardly extending portion 46 provided with an opening 47 at the outer end thereof, this opening acting as a scoop in the annular chamber 72 to discharge liquid from that chamber when the brake mechanism is rotating. A passage 48 extends inwardly from the opening 47, and terminates in a portion 49 which registers with the outlet passage 44 in the stator. FIG. 7 shows a sectional view of the members of FIG. 6 taken along lines 7—7, and this section is the view shown in FIG. 1. Since in a propeller shaft brake the propeller shaft normally rotates in one direction when the vehicle is going ahead, this extension is so arranged that the scoop or opening 47 faces in a direction opposite to the direction of rotation of the drum when the vehicle is going in a forward direction. Thus the mechanism of FIG. 1, when viewed from the left, rotates in a clockwise direction.

The inlet and outlet passages 23 and 44 are are extended respectively to inlet and outlet connections 50 and 51 in the stator, these being adapted to be connected by suitable conduits with a suitable heat exchanger or liquid reservoir, not shown, it being understood that the mechanism may receive cooling liquid from the heat exchanger through the connection 50 and the inlet passage 23, liquid being returned to the heat exchanger through the outlet passage 44 and the connection 51 to the heat exchanger.

With the inlet and outlet connections 50 and 51 connected to a heat exchanger or a suitable liquid reservoir as heretofore described, it will be understood that on rotation of the rotor, carrier and drum in a clockwise direction as viewed in FIG. 2, the inlet and outlet passages 23 and 44, the annular chamber 22 and the annular chamber 27 will be substantially filled with cooling liquid, particularly in view of the fact that the opening 47 in the member 46 is preferably positioned in the uppermost part of the annular chamber 27 in order to permit the discharge of air therefrom. Rotation of the drum and associated members just described will exert a centrifugal force on the liquid in the radial passages 21 and consequently the mechanism will attempt to pump liquid outward through these passages and thence to the right as viewed in FIG. 1 through valleys or passages 52 formed between the teeth 29 on the drum 28. This liquid will tend to pass into the annular chamber 27 through the passage 43, and the liquid in this chamber will rotate with the carrier, rotor and drum. Due to the presence of the extension member 46, however the opening 47, which faces in a direction opposite to the direction of rotation of the drum, will tend to scoop liquid from the annular chamber 27 and force it back to the heat exchanger through the outlet passage 44 and the outlet connection 51, whereupon the liquid will pass through the heat exchanger and back to the brake mehcanism through the inlet connection 50, the inlet passage 23, and thence through the path or paths just described. Thus there will be a continuous circulation of liquid through the valleys 52 between the teeth 29 on the cylindrical drum and this liquid will be in intimate heat transfer engagement with substantially the entire inner surface of the drum including substantially the entire surface of the teeth themselves in order to conduct heat away from the drum caused by application of a brake band to the outer surface thereof. It should also be noted, that leakage of liquid from the brake mechanism is prevented by conventional rotary seals 53 and 54 installed between the stator and the carrier and rotor respectively. It is important to note, as heretofore indicated, that the mechanism is substantially filled with cooling liquid at all times, due to the location of the scoop opening 47 on the stationary extension 46, there thus being very little air or vapor to be dissipated from the brake mechanism during operation.

Although various braking means may be associated with the rotating brake drum in order to retard the vehicle, the arrangement in the present instance may include a conventional brake band 55 having a composition brake lining 56 secured thereto, the composition lining preferably being relatively non-heat-conductive and being formed of a fibrous material together with a binder and suitable friction augmenting and modifying materials. The brake band, as shown more particularly in FIG. 2, is provided with actuating lugs 57 and 58 at either end, the brake band being anchored against rotation by means of a suitable lug 59 engaging a stationary lug 60 in well known manner. Brake band retracting springs 61 and 62 are interposed respectively between the lugs 57 and 58 and a stationary member 63, and serve, when the brake is released, to maintain the brake lining 56 out of contact with the surface of the brake drum. The brake band is actuated by conventional mechanism which includes a rod 64 extending through lugs 57 and 58 and the stationary member 53, the rod having a nut 65 at its lower end engaging in the under side of the lug 58, the upper end of the rod having a hook portion 66 and a pivot pin 67 extending therethrough. The pivot pin is secured to a cam 68, and this pin is positioned in the mechanism by means of a link 69 pivotally mounted on the stator by means of pivot pin 70. The cam has a portion 71 adapted to engage washers 72 interposed between the upper side of the lug 57 and the portion 71 of the cam. On rotation of the cam to the right or in a clockwise direction as viewed in FIG. 5, it will be understood that the portion 71 of the cam tends to depress the lug 57, while at the same time, the pin 67 acting on the hook portion 66 moves the rod 64 upward to correspondingly effect upward movement to the lug 58. Consequently the lugs 57 and 58 are drawn together on rotation of the cam and the brake lining engages the surface of the drum in order to retard the rotation thereof. When this occurs, the heat developed by the friction of the braking action is transmitted to the cooling liquid and thence dissipated in the heat exchanger or liquid reservoir at a point removed from the brake mechanism itself. It is to be understood that the brake band operating mechanism per se forms no part of the present invention, and that other brake actuating mechanisms and shoe forms may be utilized without departing from the spirit of the invention.

Although the above described mechanism is not in any sense of the word a fluid friction braking device, it will be apparent that due to the pumping action which occurs, a certain amount of fluid friction occurs when the drum is rotating, due to the pumping action described, and it will be further understood that when the vehicle is proceeding along the highway with the brake released, a certain amount of power will be required for this pumping action, and that in addition, a certain amount of heat will be developed in the brake mechanism due to this fluid friction. In order to minimize or prevent this power loss and this development of heat due to fluid friction, the inlet connection 50, as shown in FIG. 2 and more particularly in FIG. 4 may be provided with a throttle valve 73 mounted on a shaft 74 as shown. Although the throttle valve is shown as being installed in the inlet connection, it can be installed elsewhere in the system if desired, the purpose of the valve being to reduce or eliminate the power loss due to the pumping action when the vehicle is moving and the brake is released. A throttle valve operating lever 75 is mounted on the upper end of the valve shaft, and is normally maintained in the position shown by means of a return spring 76. Thus with the brake released, the throttle valve is normally in closed or nearly closed position.

Although the brake band may be operated by any suitable actuating means, in the present instance, as shown particularly in FIG. 5, a cable control is utilized, a cable conduit 77 being secured to a stationary bracket 78 on the stator, and a brake actuating cable 79 extending through the conduit and being connected to the cam 68 by means of a suitable pin 80, the other end of the cable being connected to the brake lever, not shown, in the conventional manner. Thus, on movement of the cable 79 to the right as viewed in FIG. 5, the cam will be rotated in a clockwise direction and the brake band will be contracted to effect engagement of the brake lining 56 with the outer surface of the brake drum 28 in the manner heretofore described. The mechanism is so arranged as to open the throttle valve fully during the initial movement of the brake cam operating cable, and to this end the lever 75 has a downwardly extending portion 81 adapted for engagement by an upper portion 82 of the cam. The upper end of the cam has a rearwardly extending portion 83, and this portion is so shaped as to slide by the edge of the lever 81 as soon as the latter is moved sufficiently to fully open the throttle valve, so that during further clockwise rotation of the cam 68, the throttle valve will remain in fully opened position in order to impose no restriction on the flow of cooling liquid through the mechanism. Thus, the pumping action and the consequent power loss due to fluid friction can be completely eliminated if desired when the brake is in released position.

It should be pointed out, however, that even though the throttle valve is fully closed, the brake mechanism will contain cooling liquid, and consequently some fluid friction is developed in agitating this liquid during rotation of the brake mechanism when the brake is released, and in some instances the resulting heat formed due to fluid friction may be sufficient to cause the formation of steam within the brake mechanism. In order to overcome this, and referring particularly to FIG. 4, a throttle valve by-pass arrangement may be provided, wherein a passage 84 extends from one side of the throttle valve to the other. The lower end of the passage is provided with a port 85 adapted to be closed by a valve 86 threadedly mounted in the stator as shown, the valve being adjustable to open or close the port 85 as desired in order to bleed the liquid past the closed throttle valve. In the event overheating of the liquid occurs with the throttle valve closed and the vehicle in motion, this valve may be adjusted to provide sufficient flow to dissipate the heat developed in the brake mechanism by pumping this liquid through the heat exchanger, or as an alterative, the throttle valve may be so arranged as to be open slightly with the brake released.

As indicated heretofore, an important feature of the invention is the means provided for supporting the metal friction element or brake drum. In liquid cooled brakes of this type, although various high thermal conductivity metals are preferably utilized as heretofore stated, metals such as copper and silver have been found to be particularly advantageous in a brake of this type, as they not only have high heat conductivity, but also excellent friction and wear characteristics when utilized with a relatively non-heat-conductive brake lining of the so-called composition type heretofore described. These particular metals are in many cases very ductile and are lacking in strength, and hence must be supported in some manner in order to prevent distortion of the metals when subjected to the forces of the brake shoes or brake bands thereon. It is also desirable that these metal friction elements or drums be of relatively thin metal, which further enhances the need for some sort of support to prevent distortion. By utilizing the teeth on the inner surface of the brake drum 28 as previously disclosed, and by so shaping the teeth that there is very little metallic contact between the ends of the teeth and the drum carrier, the friction element is supported, and substantially the entire inner surface of the thin metal brake drum is subjected to the action of the cooling liquid flowing axially or longitudinally of the drum through the valleys or passages formed between the teeth. Thus a very effective cooling action is obtained due to the greatly increased area provided by the teeth, and due to the fact that substantially the entire surface of the teeth is exposed directly to the action of the cooling liquid. In addition, due to the axial flow of the liquid, the distance through which the liquid is subjected to the heat in the brake drum is substantially very short, and consequently the temperature differential between the right and left ends of the drum is also relatively small, this tending to reduce undesirable hot spots and unequal expansions in various parts of the brake drum. It will be obvious, however, that some general expansion and contraction must take place in the brake drum during operation of the brakes, and this has been taken care of by mounting the ends of the drum in sliding engagement respectively with the drum carrier and the rotor. It has also been found desirable to take the torque of the brake drum at one end only, in order to further permit free expansion of the drum at the other end thereof due to changes in temperature. Although the teeth on the drum have been shown as being parallel with the axis of the drum, it will be understood that helical teeth may be utilized without departing from the spirit of the invention.

Although the mechanism in FIG. 1 is shown as having the radial passages 21 which act in effect as impeller blades to pump liquid outward therethrough in the same manner as a centrifugal pump, it will be understood that these passages are not necessarily essential to the satisfactory operation of the brake mechanism, it being only necessary to provide means for conducting liquid from the annular chamber 22 to the groove 41 at the left end of the drum. In other words, the passages 21 need not be separate from the annular chamber 27, as the action of the scoop opening 47 provides a pumping action to insure the circulation of liquid through the brake mechanism.

It will be understood from the foregoing that the means for supporting the metal brake drum or friction element forms an important feature of the invention, and although described in detail in connection with FIGS. 1 to 10 as embodied in a brake of the drive shaft type, it will be understood that friction elements similar to the brake drum 28 of FIG. 1 may be utilized in other forms of brake mechanisms and that the metal friction elements may be supported by directly adjacent parallel teeth in the same manner with the valleys between the teeth forming passages for the flow of cooling liquid in order to remove the heat from the metal friction element during a brake application.

Referring to FIGS. 11 to 13, for example, an arcuate internal brake shoe, preferably of the rigid type, is illustrated in connection with a brake drum wherein the brake lining is carried by the drum and the metal friction element is carried by the brake shoe. Thus, a brake shoe member 87 is provided, preferably of a rigid metal, having a supporting platform 88 extending through the major portion of the shoe member length. A metallic friction element 89, which is preferably formed of high thermal conductivity metal as heretofore set forth, is provided with a plurality of directly adjacent arcuate teeth or ribs 90, valleys 91 between the teeth forming passages for cooling liquid substantially coextensive with the length of the arcuate brake shoe member. The peripheral portions of the friction element 89 are secured to the shoe member 87 by brazing, welding, or other suitable means, and the end portions of the shoe member, as shown in FIG. 12 illustrating a section of the brake shoe of FIG. 11 taken along line 12—12, are provided with plenum chambers 92, these plenum chambers being provided with inlet and outlet conduits 94 and 95. As shown in FIG. 13, the supporting surface 88 of the brake shoe member is so arranged as to be in direct contact with the ends or peaks of the teeth 90, the teeth preferably being formed with an arcuate shape at their ends in order to provide substantially line contact with the supporting platform 88. The plenum chambers are adapted to be connected to a suitable source of circulating cooling liquid so as to provide for circulation through the valleys or passages 91 from one end to the other, and in view of the fact that the teeth have very narrow or substantially line contact with the supporting platform 88, substantially the entire inner surface of the friction element 89 is subjected to the action of the cooling liquid throughout the entire length of the element which is subjected to the braking action. A brake drum 96 is mounted on the vehicle axle in a well known manner, the inner surface of the drum being provided with a composition friction lining 97 adapted to be engaged by the metal friction element 89 on the brake shoe when the latter is moved outwardly. A conventional hydraulic cylinder 98 is provided with a piston, not shown, connected to the upper end of the brake shoe by means of a piston rod 99, the lower end of the brake shoe being engaged with an anchor pin 100. The hydraulic cylinder is connected to a conventional master cylinder by means of a conduit 101, and when the pressure in the hydraulic cylinder is increased in response to operation of the brake pedal by the vehicle driver, the brake shoe is moved outward to effect engagement of the metallic friction element 89 with the inner surface of the composition brake lining 97. As heretofore stated, the composition brake lining is preferably of relatively non-heat-conductive material, and consequently the brake drum is insulated from the heat developed during a brake application and substantially no expansion and contraction of the brake drum occurs due to thermal effects. As indicated in FIG. 11a, the teeth 90 extend nearly to the end of the metal friction element 89, these teeth terminating in the region of the plenum chambers adjacent either end of the element. The remaining portion 101a of the friction element extending to the right of the teeth in the above figure beyond the plenum chamber is relieved so as not to engage the friction lining on the brake drum, and is suitably secured to the brake shoe member 87 as heretofore described.

In like manner, metal friction elements of the type above described are also adapted for use in connection with brakes of the disc type as shown more particularly in FIGS. 14 and 15. Referring first to FIG. 14, a wheel 102 is mounted for rotation on an axle 103 by means of bearings 104 and 105, the left side of the wheel being provided with a flat annular surface portion 106 to which is attached by suitable means, an annular flat friction ring 107 formed of composition brake lining, preferably of the type heretofore described. An annular cylinder member 108 is secured to the axle, this being provided with an annular bore 109 concentric with the axis of rotation of the wheel. A piston 110 is slidably mounted in the bore, the piston being annular and being sealed against leakage by means of O rings 111 and 112. An annular channel 113 is formed in the right end of the piston having a supporting floor or platform 114 therein. The right end of the channel is closed by a metallic friction element 115, preferably formed of one of the high thermal conductivity metals heretofore set forth. The right side of the element has a smooth friction surface 116 adapted for engagement with the left face of the composition friction ring 107, the left face of the metallic friction element having a plurality of directly adjacent concentric teeth 117 formed thereon, the valleys 118 between the teeth forming concentric passages for the circulation of cooling liquid in order to remove the heat of braking from the metallic friction element. The supporting platform 114 extends substantially around the entire length of the piston channel except for plenum chambers 118a, shown in FIG. 15, and 119 shown in FIG. 14, these plenum chambers being shaped substantially as shown in FIG. 15 and being spaced preferably substantially 180° apart. The ends or peaks of the teeth 117 are preferably arcuate in shape, or at least very narrow, and consequently have substantially line contact with the supporting platform 114 at the right end of the piston groove. Therefore substantially the entire surface of the friction element on the left side thereof is subjected to the action of the cooling liquid flowing through the passages 118, while the teeth serve to adequately support the element.

The circulation of liquid through the passages 118 is provided by conduits 120 and 121 secured to the cylinder member 108, the right ends of the conduits extending into and being slidably engaged in bores 122 and 123 formed in the piston at spaced apart points and registering respectively with the plenum chambers 119 and 118a. Suitable seals 124 and 125 prevent leakage between the plenum chambers and a pressure chamber 126 formed between the cylinder and the piston as shown. In order to actuate the piston to effect frictional engagement of the metallic friction element 115 with the surface of the composition friction ring 107, an inlet port 126a is provided in the cylinder, and communicates with the annular pressure chamber 126. This port, when the brake is in operation, is connected by suitable tubing with a conventional master cylinder on the vehicle, and on depression of the brake pedal by the operator, the master cylinder pumps hydraulic fluid into the chamber to move the piston to the right to effect the brake application, although it will be understood that other means may be utilized to actuate the piston or brake shoe 110 in order to effect the above referred to friction engagement.

From the foregoing, it will be apparent that liquid will enter one of the plenum chambers through one of the conduits 120 or 121, circulate through substantially 180° through the valleys or channels 118, and be discharged through the other plenum chamber and conduit, it being understood that the inlet and outlet conduits are connected to a suitable heat exchanger or liquid reservoir, and that a pump may be utilized to insure circulation of the liquid through the passages between the teeth on the metallic friction element. From the foregoing it will be apparent that the teeth of the metallic friction element are in substantially line contact with the platform 114 through substantially their entire length, the only parts not having contact being those directly over the plenum chambers 118a and 119. Consequently the metallic friction element is adequately supported against distortion due to the force of braking, and the construction shown permits the use of the desirable ductile high thermal conductivity metals as heretofore set forth.

In the event even more efficient heat transfer from the metal friction element to the cooling liquid is desired, the surface area of the teeth exposed to the liquid may be materially increased by forming a plurality of directly adjacent fine substantially V-shaped grooves 127 on the surfaces of the teeth as shown in FIG. 16, these grooves running longitudinally of the teeth and being formed by broaching or in any other suitable manner. For example, if the walls of the grooves have an included angle of the order of 30°, the area of the teeth exposed to the cooling liquid can be increased over three times, thus compensating in large measure for the heat barrier between the surface of the metal friction element and the liquid due to the so-called "film effect." Such grooves may also be incorporated in the structures of FIGS. 13, 14 and 17 if desired.

Although in the mechanism of FIG. 1 the liquid is circulated by the brake mechanism itself, it may be desirable in some cases to utilize a separate pump, driven by the vehicle engine or otherwise to circulate liquid in a brake drum assembly having a cylindrical metal friction element of the type shown in FIG. 1, and one example of a brake drum assembly adapted for such use is illustrated in FIG. 17.

This mechanism includes a non-rotatable member or stator 4 which may be secured to a stationary frame, not shown. A drive shaft 11 is mounted for rotation on bearings 12 and 13 carried by the stator, one end of the shaft being adapted to be connected to a source of power and the other end being adapted to be connected to a mechanism adapted to be driven thereby. The shaft is provided adjacent its left end with a flange 18 secured to a rotor 19 with cap screws 20 as shown. A brake drum carrier 24 is secured to the rotor by cap screws 25, the carrier having an outer cylindrical surface 26 adapted to support a cylindrical metal friction element or brake drum 28. The drum is formed as shown in FIGS. 8 and 9, preferably of high thermal conductivity metal, with an outer cylindrical friction surface 28a and a plurality of directly adjacent parallel teeth 29 formed on the inner surface. Bores 30 and 31 are formed respectively in the right and left ends of the drum. Cylindrical surfaces 33 and 34 are formed on the carrier and rotor, and the bores 30 and 31 are slidably mounted on these surfaces, the peaks of the drum teeth 29 being in supporting engagement with the cylindrical drum carrier surface 26. Lugs 32 on the left end of the drum engage notches 33 formed along the edge of rotor 19, the drum thus being mounted for thermal expansion and driven in the same manner as the drum of FIG. 1. Seals 37 and 38 of the O ring type prevent leakage between the drum and the drum carrier and rotor. Rotary seals 53 and 54 are spaced as shown and prevent leakage between the stator and the drum carrier and rotor.

The interior of the drum assembly is divided into separate inlet and outlet chambers 128 and 129 by means of an annular partition 130 formed on the drum carrier as shown, and having a central bore 131 which is a running fit on the outer cylindrical surface 132 of a stationary partition member 133 secured to the stator by means of a screw 134. An inlet passage 135 extends from the outside of the stator to the chamber 128, and an outlet passage 136 extends from the outside of the stator into chamber 129. The left and right ends of the teeth 29 are spaced from the drum carrier and rotor respectively to provide annular inlet and outlet plenum chambers 137 and 138. Ports 139 in the drum carrier connect the inlet chamber with plenum chamber 137, and ports 140 in the carrier connect the outlet chamber with plenum chamber 138.

The brake mechanism of FIG. 17 may be connected in a liquid circulating system as shown in FIG. 18, the inlet passage 135 being connected by a conduit 141 to outlet 142 of a pump 143, the suction 144 of the pump being connected to the bottom of a heat exchanger 145 by a conduit 146, and the upper portion of the heat exchanger being connected to the outlet passage 136 by a conduit 147. A bleed plug 147a is preferably provided as shown to permit the bleeding of air from the mechanism during initial filling of the system.

Thus, when the pump is operated, cooling liquid is supplied to the inlet chamber 128 through conduit 141 and inlet passage 135, and passes to the outlet chamber 129 through ports 139, the passages 52 between the teeth, and ports 140, and thence back to the heat exchanger through outlet passage 136 and conduit 147. It will be apparent from the foregoing description that the liquid pressures which obtain in plenum chambers 137 and 138 due to rotation of the drum and with the pump inoperative are balanced, and that therefore there is no pumping action due to centrifugal force acting on the liquid, the pump 143 being depended on for liquid circulation. Although the chambers 128 and 129 have been designated for convenience as inlet and outlet chambers, and passages 135 and 136 as inlet and outlet passages, the connections to these passages and chambers can be reversed in the system of FIG. 18 without in any way affecting the operation of the mechanism.

Thus, in the modification shown in FIG. 17, a novel brake drum construction has been provided wherein the cylindrical brake drum or friction element is so supported as to permit the use of thin metals and high thermal conductivity metals for the friction element, and wherein the element is efficiently cooled by a circulating liquid. The fluid friction is negligible, the only parts tending to retard rotation of the liquid in chambers 128 and 129 with the drum being the portion of the stator exposed to the liquid and the stationary parts of the rotary seals 53 and 54.

With further reference to FIG. 13, it may be desirable, particularly in the event the teeth are of very small pitch, as is desirable for most efficient support of the friction element, to provide means for increasing the cross-sectional area of the cooling liquid passages. This may be done by providing corresponding teeth 148 on the brake shoe member 87, the peaks of these teeth being in register and in supporting engagement with the peaks of teeth 90 on the friction element 89, and valleys 149 between the teeth 148 forming additional cooling liquid passages in register with the passages or valleys 91 in friction element 89. With this construction, the teeth 90 may be placed closer together for better support of the friction element and the average thickness of the element can be made less for better heat transfer, while maintaining the cooling liquid passages of adequate size.

Although in the preferred form of the invention the supporting teeth are formed on the metal friction element, it will also be understood that if desired; the supporting teeth may be formed instead on the brake shoe support member as shown in FIG. 20. Here the platform 88 on the brake shoe support member 87 is formed with a plurality of directly adjacent preferably V-shaped teeth 149 having their peaks in supporting engagement with the inner surface of metal friction element 89, the valleys 150 between the teeth forming cooling liquid passages between the plenum chambers 92 shown in FIG. 11.

The modifications shown in FIGS. 19 and 20 may be incorporated in the structures of FIGS. 1, 14 and 17 if desired.

Although the mechanisms described in the foregoing specification have been described as brake mechanisms, it is to be understood that the principles of the invention are equally applicable to other frictional mechanisms such as friction clutches and the like, and the term "brake mechanisms" is intended to refer also to "clutch mechanisms."

Commercially available grades of the metal copper are listed in the pamphlet, "Commercially Important Wrought Copper Alloys," copyright 1948, Chase Brass & Copper Co., Waterbury, Conn., page 22, and in the pamphlet "Revere Copper and Copper Alloys," copyright 1949, Revere Copper & Brass, Inc., New York, New York, page 5.

Although the invention has been illustrated and described with considerable particularity, it is to be understood that the same is not to be considered as limited thereby, and that other embodiments of the invention may suggest themselves to those skilled in the art. Reference will be had, therefore, to the appended claims for a definition of the limits of the invention.

What is claimed is:

1. Liquid-cooled brake mechanism including a stator, brake drum supporting means rotatably mounted on the stator having an outer cylindrical surface, a cylindrical metal brake drum mounted on said supporting means and drivably connected therewith having a cylindrical outer friction surface and generally axially extending integral directly adjacent teeth formed on the internal surface of the drum directly opposite said friction surface, the surfaces at the peaks of said teeth being narrow and in engagement with said supporting surface, the valleys between said teeth forming cooling liquid passages, an annular inlet plenum chamber at one end of the drum connected with said cooling liquid passages at one end thereof, an annular outlet plenum chamber at the other end of the drum connected to said cooling liquid passages at the other end thereof, the cooling liquid passages formed between the teeth being connected in parallel to the annular inlet and outlet chambers and the effective passage area between plenum chambers being the sum of the cross sectional areas of the passages formed between said teeth, inlet and outlet passages extending into the stator from the outside thereof, passages in the supporting means for respectively connecting the inlet plenum chamber with the inner end of the stator inlet passage and the outlet plenum chamber with the inner end of the stator outlet passage, and rotary seal means mounted on the stator for preventing the leakage of cooling liquid between the stator and rotatable brake drum supporting means.

2. Liquid-cooled brake mechanism as set forth in claim 1, wherein the mechanism includes a heat exchanger having an inlet and an outlet, a circulating pump having an inlet connected to the heat exchanger outlet and an outlet connected to the stator inlet passage, and a connection between the stator outlet passage and the heat exchanger inlet.

3. Liquid-cooled brake mechanism as set forth in claim 1, wherein at least one end of said drum is provided with a cylindrical bore, said bore being in slidable engagement with a mating cylindrical surface formed on said drum supporting means, whereby said drum is mounted for axial thermal expansion nad contraction on said drum supporting means.

4. Liquid-cooled brake mechanism as set forth in claim 1, wherein said drum is drivably connected at one end only thereof with said drum supporting means.

5. Liquid-cooled brake mechanism including a stator, brake drum supporting means rotatably mounted on the stator having an outer cylindrical drum supporting surface, a cylindrical metal brake drum mounted on said supporting means for rotation therewith having a cylindrical outer friction surface and generally axially extending integral directly adjacent teeth formed on the inner surface of said drum directly opposite said friction surface, the surfaces at the peaks of said teeth being in engagement substantially throughout their length with said supporting surface, the valleys between said teeth forming cooling liquid passages, an annular inlet chamber of relatively small outer diameter formed by said stator and supporting means, means including radially extending passages in the supporting means connecting said inlet chamber with said cooling liquid passages at one end thereof, an annular outlet chamber of relatively large outer diameter formed by said supporting means and stator, passages in said supporting means connecting said outlet chamber with said cooling liquid passages at the other end thereof, an inlet passage in the stator terminating at the outer end on the outside of the stator and at the inner end in said inlet chamber, an outlet passage in the stator terminating at one end on the outside of the stator and at the inner end adjacent said outlet chamber, and a stationary extension mounted on the stator in said outlet chamber, said extension having a passage extending radially therethrough, the inner end of said last named passage being connected with the inner end of said outlet passage in the stator and the outer end being connected to said outlet chamber in substantially the outermost portion of said chamber.

6. Liquid-cooled brake mechanism as set forth in claim 5, wherein the outer end of said passage in said extension 5 terminates in a scoop-shaped opening, said opening facing in a direction opposite to one direction of rotation of the drum supporting means and drum.

7. Liquid-cooled brake mechanism as set forth in claim 5, wherein said stationary extension forms a wall separating said annular inlet and outlet chambers.

8. Liquid-cooled brake mechanism including a stator, a drive shaft rotatably mounted on the stator, a rotor member, a drum carrier member secured to the rotor for rotation therewith having an outer cylindrical surface, one of said members being secured to the shaft, said stator, rotor member and drum carrier member forming adjacent annular inlet and outlet chambers, said inlet chamber having a lesser diameter than said outlet chamber, a stationary extension in said outlet chamber secured to said stator, said extension forming a wall separating said inlet and outlet chambers, a cylindrical brake drum mounted on said drum carrier member drivably connected with one of said members and having an outer cylindrical friction surface formed thereon and generally axially extending directly adjacent integral teeth formed on the inner surface thereof, the surfaces at the peaks of said teeth being narrow and in engagement with said cylindrical surface of said drum carrier member, the valleys between said teeth forming cooling liquid passages, and means for circulating a cooling liquid through said passages including an annular inlet plenum chamber in said rotor member connected with said passages at one end of the drum, an annular outlet plenum chamber in said drum carrier member connected with said passages at the other end of the drum, radial passages in said rotor member connecting said inlet chamber with said inlet plenum chamber, ports in said drum carrier member connecting said outlet chamber with said outlet plenum chamber, an inlet passage in said stator extending from the outside thereof to said annular inlet chamber, a radial passage in said stationary extension terminating at its outer end in said outlet chamber adjacent the outermost portion thereof and at its inner end adjacent the stator, and an outlet passage in the stator terminating at one end on the outside of the stator and connected at the other end with said inner end of said radial passage in said stationary extension member.

9. Liquid-cooled brake mechanism including a stator, brake drum supporting means rotatably mounted on the stator having an outer cylindrical drum supporting surface, a cylindrical metal brake drum mounted on said supporting means for rotation therewith having a cylindrical outer friction surface and generally axially extending integral directly adjacent teeth formed on the inner surface of the drum directly opposite said friction surface, the surfaces at the peaks of said teeth being in engagement with said supporting surface, the valleys between said teeth forming cooling liquid passages, brake shoe mounting means on the stator, a brake shoe mounted on said mounting means for movement into and out of engagement with the friction surface on said drum, means for actuating said shoe to effect engagement of the shoe with said friction surface, means for circulating a cooling liquid through said passages between said teeth including an inlet passage in said stator having one end connected to said cooling liquid passages at one end of said drum and terminating at the other end outside the drum and adapted to be connected to a source of cooling liquid, an annular outlet chamber formed by said stator and drum supporting means connected with said cooling liquid passages at the other end of said drum, a stationary extension on said stator extending radially outward in said chamber and having a radial passage therethrough terminating at the outer end in substantially the outermost portion of said annular chamber, an outlet passage in said stator connected at one end to the inner end of the passage in said stationary extension and terminating at the other end on the outside of said stator and adapted to be connected to a source of cooling liquid, and means for controlling the flow of cooling liquid through said passages including a throttle valve associated with one of said passages in said stator, means for urging said valve toward closed position, and means responsive to operation of said actuating means to effect engagement of said shoe with said drum for moving said valve toward open position.

10. Liquid-cooled brake mechanism as set forth in claim 9, wherein said throttle valve is in said stator inlet passage.

11. Liquid-cooled brake mechanism as set forth in claim 10, wherein a bypass passage is included in said stator extending from one side of said throttle valve to the other, an adjustable valve being associated with said bypass passage for controlling the flow of liquid therethrough.

12. Liquid-cooled brake mechanism including a stator, brake drum supporting means rotatably mounted on the stator having a cylindrical outer surface, a cylindrical metal brake drum mounted on said supporting means and drivably connected therewith having a cylindrical outer friction surface and generally axially extending integral directly adjacent V-shaped teeth formed on the internal surface of the drum directly opposite said friction surface with the surfaces at the peaks of said teeth being narrow and in engagement with said supporting surface, the adjacent sides of adjacent teeth defining V-shaped valleys between the teeth forming parallel passages for cooling liquid, said stator and drum supporting means forming a pair of axially spaced annular enclosed chambers for cooling liquid, means connecting one of the chambers with said cooling liquid passages at one end of the drum, means connecting the other of said chambers with said cooling liquid passages at the other end of the drum, an inlet passage in the stator extending from the outside thereof into one of said chambers, and an outlet passage in the stator extending from the outside thereof into the other of said chambers.

13. Liquid-cooled brake mechanism as set forth in claim 12, wherein the mechanism includes a power driven pump and a heat exchanger, the outlet of the pump being connected to one of said chambers, the other chamber being connected to the heat exchanger, and the heat exchanger being connected to the inlet of said pump.

14. Liquid-cooled brake mechanism including a stator, a hollow brake drum rotatably mounted on the stator having an outer friction surface formed thereon, brake shoe mounting means on the stator, a brake shoe mounted on the mounting means for movement into and out of engagement with said friction surface, means for actuating said shoe to effect engagement thereof with said friction surface, means for supplying a cooling liquid to said hollow drum and for discharging cooling liquid therefrom including an inlet passage in the stator extending from the outside of the stator into the drum and terminating therein in a region adjacent the axis of rotation thereof, an outlet passage in the stator extending from the outside thereof into the drum and terminating therein in a region spaced radially outward from the first named region, a throttle valve associated with one of said passages, means for biasing said valve toward closed position, and means operable on operation of said actuating means to move said shoe to effect a brake application for moving said throttle valve toward open position.

15. A liquid cooled brake member for a friction brake including a pair of metal elements secured together, one of the adjacent surfaces of said elements being a supporting surface and the other of said surfaces having a plurality of directly adjacent closely spaced parallel V-shaped teeth formed therein with surfaces at the peaks of said teeth being in engagement with said supporting surface, the adjacent sides of adjacent teeth defining V-shaped valleys between said teeth forming, in conjunction with said supporting surface, V-shaped cooling liquid passages, and means for circulating a cooling liquid through said passages including inlet and outlet passages in one of said elements connected to each of said cooling liquid passages at spaced apart regions thereof, the cooling liquid passages formed between said teeth being connected in parallel to the inlet and outlet passages and the effective passage area between said inlet and outlet passages being the sum of the cross sectional areas of the passages formed between said teeth.

16. A liquid cooled brake member for a friction brake as set forth in claim 15, wherein a plurality of directly adjacent teeth are formed in said supporting surface having the same pitch as the teeth on the other element, the surface at the peaks of the teeth on one element being in engagement with the surfaces at the peaks of the teeth on the other of said elements.

17. A liquid-cooled brake member for a friction brake mechanism including supporting means having a cylindrical supporting surface formed thereon, a cylindrical metal friction element having a smooth cylindrical friction surface on one side thereof and a plurality of directly adjacent axially extending V-shaped parallel teeth on the opposite side, the adjacent sides of the teeth forming, in conjunction with the supporting surface, V-shaped parallel cooling liquid passages substantially coextensive with the axial length of the element, the surfaces at the peaks of said teeth being in engagement with said supporting surface and the teeth being preloaded in compression, and means for circulating a cooling liquid through said passages including a stator, the supporting means being mounted for rotation thereon, an inlet passage associated with the supporting means and connected to said V-shaped cooling liquid passages at one end thereof, an outlet passage associated with the supporting means and connected to said V-shaped passages at the other end thereof, said V-shaped passages being connected in parallel and the effective passage area between said inlet and outlet passages being the sum of the cross-sectional areas of said V-shaped passages, and inlet and outlet passages extending into the stator from the outside thereof and connected respectively with the inlet and outlet passages associated with said supporting means.

References Cited in the file of this patent

UNITED STATES PATENTS

| | | |
|---|---|---|
| 1,131,810 | Zoller et al. | Mar. 16, 1915 |
| 1,453,599 | Parker | May 1, 1923 |
| 1,536,558 | Bukowsky | May 5, 1925 |
| 1,894,001 | Myers | Jan. 10, 1933 |
| 1,952,967 | Boughton | Mar. 27, 1934 |
| 2,051,286 | Boykin | Aug. 18, 1936 |
| 2,407,197 | Watts | Sept. 3, 1946 |
| 2,664,176 | Whalen | Dec. 29, 1953 |
| 2,747,702 | Van Zelm | May 29, 1956 |
| 2,821,273 | Sanford et al. | Jan. 28, 1958 |
| 2,880,823 | Sedergren | Apr. 7, 1959 |
| 2,934,178 | Eaton | Apr. 26, 1960 |

FOREIGN PATENTS

| | | |
|---|---|---|
| 1,123,407 | France | June 11, 1956 |
| 670,452 | Germany | Jan. 19, 1939 |
| 653,565 | Great Britain | May 16, 1951 |